United States Patent [19]
Wallace

[11] Patent Number: 5,631,849
[45] Date of Patent: May 20, 1997

[54] DECOMPRESSOR AND COMPRESSOR FOR SIMULTANEOUSLY DECOMPRESSING AND COMPRESSNG A PLURALITY OF PIXELS IN A PIXEL ARRAY IN A DIGITAL IMAGE DIFFERENTIAL PULSE CODE MODULATION (DPCM) SYSTEM

[75] Inventor: Gregory K. Wallace, Palo Alto, Calif.

[73] Assignee: The 3DO Company, Redwood City, Calif.

[21] Appl. No.: 338,427

[22] Filed: Nov. 14, 1994

[51] Int. Cl.$^6$ .................................................. H04N 11/04
[52] U.S. Cl. ...................... 364/514 R; 382/233; 375/244; 348/410
[58] Field of Search .................. 364/514 R; 375/241, 375/242, 244; 345/202; 358/530, 539, 535; 382/232, 233, 166; 341/50, 143; 348/390, 391, 343, 420, 421, 400, 472, 409, 410

[56] References Cited

U.S. PATENT DOCUMENTS 4,864,397  9/1989  Zehner et al. .......................... 358/136

OTHER PUBLICATIONS

Rabbani et al., Digital Image Techniques, Tutorial Texts in Optical Engineering, vol. TT7, Eastman Kodak Company, Ch. 9 Lossy Predictive Coding, pp. 79–94.

U.S. application No. 08/060,613, Miller et al., filed May 12, 1993.

Gregory K. Wallace et al., *The JPEG Still Picture Compression Standard*, IEEE Transactions on Consumer Electronics, vol. 38, No. 1, Feb. 1992, pp. xvii–xxiv.

Majid Rabbani et al., *Digital Image Compression Techniques*, Tutorial Texts in Optical Engineering, vol. TT7, Eastman Kodak Company, Ch. 9 Lossy Predictive Coding, pp. 79–94.

*Primary Examiner*—Edward R. Cosimano
*Assistant Examiner*—Tony M. Cole
*Attorney, Agent, or Firm*—Fliesler, Dubb, Meyer & Lovejoy

[57] ABSTRACT

A digital image differential pulse code modulation decompressor for simultaneously generating, during a cycle of operation of said decompressor, a decompressed value for a plurality of selected pixels located on a diagonal of an array of pixels. A storage stores an error value for each selected pixel to be processed during a cycle of operation of the decompressor. A processor simultaneously generates a decompressed value for each selected pixel where the decompressed value is derived from the error value for each selected pixel and a predicted value generated by the processor for each selected pixel. The predicted value is derived from a predictor which is at least a second order, two dimensional predictor.

A digital image differential pulse code modulation compressor for simultaneously generating, during a cycle of operation of said compressor, a decompressed value and a encoded quantized error value for each of a plurality of selected pixels located on a diagonal of an array of pixels where the encoded quantized error values will be used in generating an image represented by said array of pixels.

15 Claims, 5 Drawing Sheets

COLUMNS

|   | | 1 | 2 | 3 | 4 | 5 | 6 | 7 | 8 | 9 | 10 | 11 | 12 |
|---|---|---|---|---|---|---|---|---|---|---|----|----|----|
|ROW| 1 | 1 | 2 | 3 | 4 | 5 | 6 | 7 | 8 | 9 | 10 | 11 | 12 |
|   | 2 | 2 | 3 | 4 | 5 | 6 | 7 | 8 | 9 |10 | 11 | 12 | 13 |
|   | 3 | 3 | 4 | 5 | 6 | 7 | 8 | 9 |10 |11 | 12 | 13 | 14 |
|   | 4 | 4 | 5 | 6 | 7 | 8 | 9 |10 |11 |12 | 13 | 14 | 15 |
|   | 5 |16 |17 |18 |19 |20 |21 |22 |23 |24 | 25 | 26 | 27 |
|   | 6 |17 |18 |19 |20 |21 |22 |23 |24 |25 | 26 | 27 | 28 |
|   | 7 |18 |19 |20 |21 |22 |23 |24 |25 |26 | 27 | 28 | 29 |
|   | 8 |19 |20 |21 |22 |23 |24 |25 |26 |27 | 28 | 29 | 30 |
|   | 9 |31 |32 |33 |34 |35 |36 |37 |38 |29 | 40 | 41 | 42 |
|   |10 |32 |33 |34 |35 |36 |37 |38 |29 |40 | 41 | 42 | 43 |
|   |11 |33 |34 |35 |36 |37 |38 |29 |40 |41 | 42 | 43 | 44 |
|   |12 |34 |35 |36 |37 |38 |29 |40 |41 |42 | 43 | 44 | 45 |

DECOMPRESSOR AND COMPRESSOR FOR SIMULTANEOUSLY DECOMPRESSING AND COMPRESSNG A PLURALITY OF PIXELS IN A PIXEL ARRAY IN A DIGITAL IMAGE DIFFERENTIAL PULSE CODE MODULATION (DPCM) SYSTEM

CROSS-REFERENCES TO RELATED APPLICATIONS

This application is related to: U.S. PCT patent application Ser. No. 07/970,308, entitled AUDIO/VIDEO COMPUTER ARCHITECTURE, by inventors Mical et al., filed Nov. 2, 1992;

U.S. PCT patent application Ser. No. 08/001,463, entitled DIGITAL SIGNAL PROCESSOR ARCHITECTURE, by inventor Donald M. Grey, III, filed Jan. 6, 1993.

The related patent applications are all commonly assigned with the present application and are all incorporated herein by reference in their entirety.

BACKGROUND OF THE INVENTION

1. Field of the Invention

The invention relates to a digital image compression system and more specifically to a Differential Pulse Code Modulation (DPCM) compression system.

2. Description of the Related Art

Figure 1:
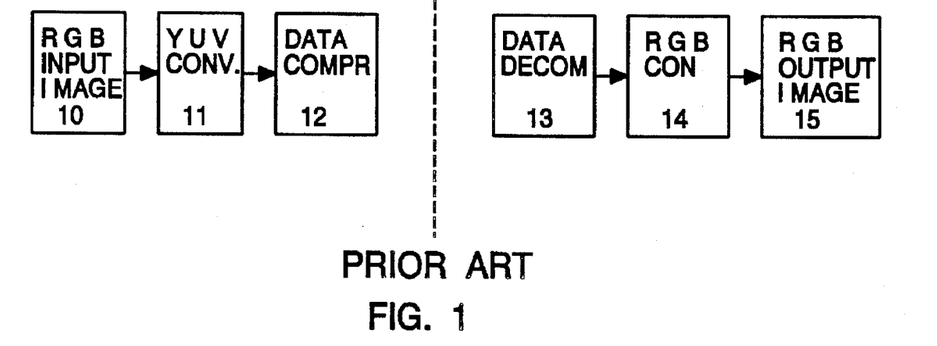
FIG. 1 is a diagram illustrating a color compressed image transmission system.

A typical color compressed image transmission system is shown in FIG. 1. The image is initially recorded as an array of pixels where each array pixel is comprised of a red pixel, a green pixel and a blue pixel. Each red (R), green (G) and blue (B) pixel is represented by an eight bit binary value and stored in the RGB input image storage 10. A typical array has the dimensions of 320 pixels by 240 pixels for a total of 76,800 pixels for each color in each image. Thus, 614,400 bits of digital data is necessary to represent each of the red pixel array, the green pixel array and the blue pixel array. Thus, 1,843,200 bits, or 230,400 bytes, of digital data is necessary to represent the entire image.

Figure 2:
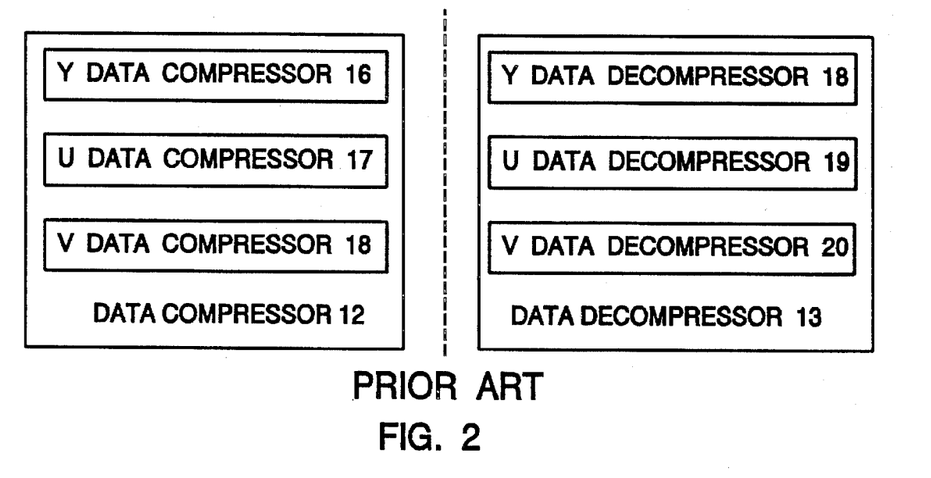
FIG. 2 is a diagram illustrating the use of three separate compressors and decompressor for the YUV pixels respectively.

The red, green and blue pixels for each pixel in the array is converted into an eight bit Y pixel, an eight bit U pixel and an eight bit V pixel by a YUV converter 11. The typical conversion factors used are $Y=0.587G+0.299R+0.114B$, $U=B-Y$ and $V=R-Y$. The YUV pixels are compressed by data compressor 12 to reduce the number of bits required to store or transmit the image as an array of pixels where each array pixel is composed of a compressed Y pixel, a compressed U pixel and a compressed V pixel. Data compressor 12 contains, as shown in FIG. 2, a Y data compressor 16 to compress the Y pixel, a U data compressor 17 to compress the U pixel and a V data compressor 18 to compress the V pixel.

The compressed image data is transmitted to a receiver or read directly from a storage medium, such as a compact laser disc, by a receiver. The receiver decompresses the compressed YUV pixels by data decompressor 13. Data decompressor 13 contains, as shown in FIG. 2, a Y data decompressor 18 to decompress the compressed Y pixels, a U data decompressor 18 to decompress the compressed U pixels and a V data decompressor to decompress the compressed V pixels. The YUV pixels are then converted into RGB pixels by RGB convertor 14 which are then stored in RGB output storage 15 as an array of pixels representing the original image.

In a lossy data compression system the decompressed Y, U and V pixels will not have the same value as the original uncompressed Y, U and V pixels. Lossy data compression systems are used because they allow greater compaction of the image data while still providing an acceptable recreated image.

One such lossy compression system is known as the Differential Pulse Code Modulation (DPCM) system which is described in detail in Chapter 9 of the text entitled "DIGITAL IMAGE COMPRESSION TECHNIQUES" by Majid Rabbani and Paul W. Jones, published by SPIE Press in 1991.

Figure 3:
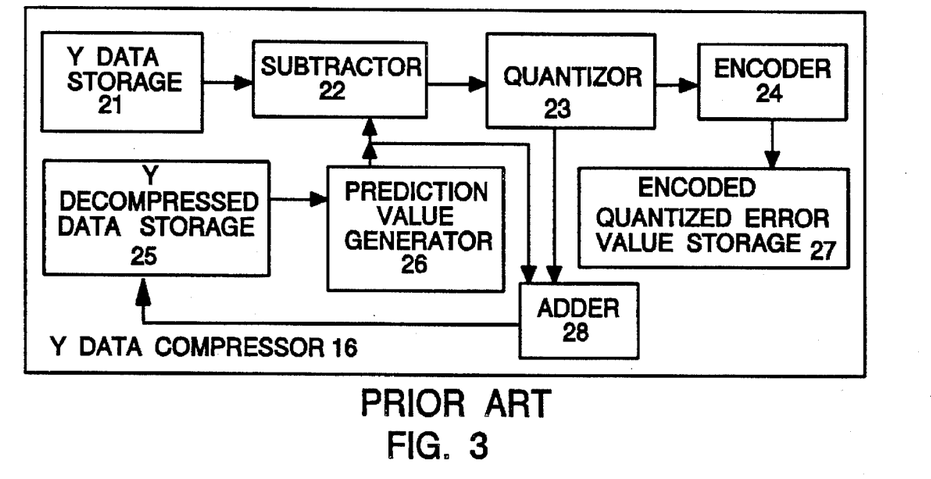
FIG. 3 is a block diagram of a Y data compressor in a DPCM system.

FIG. 3 illustrates a Y data compressor 16 used in a DPCM system. An eight binary bit pixel value for each Y pixel of the array is stored as one byte of data in Y data storage 21. A prediction value generator 26 generates a digital predicted value for each Y pixel based on previously generated decompressed values for other Y pixels in the array which have been stored in Y decompressed data storage 25. The predicted value generated by prediction value generator 26 for each pixel is subtracted from the pixel value of the Y pixel stored in the Y data storage 21 to form an error value. The error value can have a value between 255 and −255. A quantizor 23 is used to decrease the number of possible values for the error value. One type of quantizor uses thresholding to map the values between thresholds into a single value. For example, if the thresholds are established as 0, 9 and −9, any value more negative than −9 will have an assigned value of −12, any value between 0 and −9 will have an assigned value of −3, any value of 0 through +9 would have an assigned value of +3 and any value greater than +9 will have an assigned value of +12. The assigned value determined by the quantizor 23 for the error value for a pixel is added by adder 28 to the predicted value for that pixel generated by prediction value generator 26 to form a decompressed value for that pixel. The decompressed value is then stored in the Y decompressed data storage 25 to be used by the prediction value generator 26 in generating predicted values for other pixels in the array. The assigned values of the quantizor 23 are then encoded into a two bit code by encoder 24. For example, the value of +12 would be encoded as 00, the value of +3 would be encoded as 01, the value of −3 would be encoded as 10 and the value of −12 would be encoded as 11. The two bit encoded quantized error value for the compressed pixel would then be stored in the encoded quantized error value storage 27 for transmission or recording on a storage medium. Each Y pixel is now represented by a 2 bit encoded quantized error value.

Figure 4:
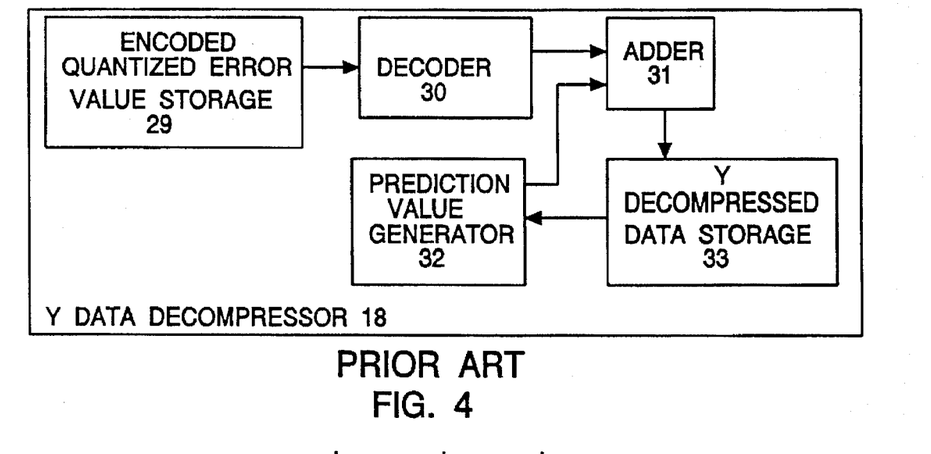
FIG. 4 is a block diagram of a Y data decompressor in a DPCM system.

Referring to FIG. 4, a Y data decompressor 18 receives and stores in encoded quantized error value storage 29 the two bit encoded quantized error value for each Y pixel in the array. Decoder 30 converts each two bit encoded quantized error value into the assigned error value for that pixel which was assigned initially by the quantizor 23 in the Y data compressor 16. Continuing with the example, the selected error value generated by the statistical decoder 30 will either be +12, +3, −3 or −12. Prediction value generator 32 generates a predicted value for the pixel whose assigned error value is presently being presented by statistical decoder 30. The predicted value is derived from decompressed values stored in Y decompressed data storage 33 of other pixels previously decompressed. Adder 31 adds together the assigned error value for the pixel and the predicted value for the pixel to form a decompressed value for the pixel. The decompressed value is then stored in the Y decompressed data storage 33 for use by predicted value generator 26 in generating predicted values for other pixels in the array.

In the DPCM System, it is important that the predicted value generated by predicted value generator 26 in compressor 16 for a given pixel is the same as the predicted value generated by predicted value generator 32 in decompressor 18.

Figure 5:
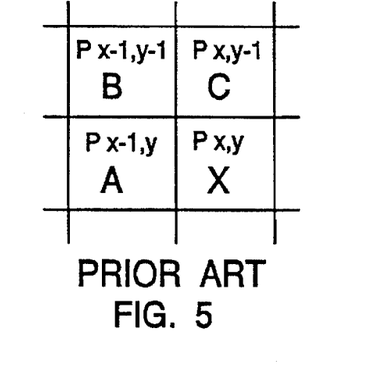
FIG. 5 is a drawing illustrating the relative position of pixel X to pixels A, B and C.

The Y pixel array can be considered as an array comprised of rows and columns. It is a common practice to generate the decompressed values for the Y pixels one at a time starting at the upper left hand corner of the array and proceeding across each row from left to right and the rows from top to bottom. This procedure is used because the DPCM system employs predictors which use previously generated decompressed values of pixels in the generation of the predicted value by the prediction value generator. One of the commonly used 3rd-order, 2-D predictors is $X=0.75(A+C)-0.5B$ where X is the predicted value to be generated and A, B and C are decompressed values previously generated for pixels in the array. FIG. 5 illustrates the location in the array of pixels A, B and C relative to pixel X. In order to calculate the top row and the left most column in the array, mid scale grey constants are used for the decompressed values when no other data is available.

In the DPCM system, the time necessary to decompress the Y pixel array is determined by the time needed to decompress a single Y pixel in the array. Only one pixel may be decompressed at a time whenever a 2nd or 3rd order, 2-D predictor is being used since the predictors use the decompressed values of other pixels previously decompressed by the system. The accuracy of the predictor determines the quality of the reconstructed image.

SUMMARY OF THE INVENTION

Accordingly, it is an object of the present invention to provide a method and an apparatus for simultaneously generating decompressed values for a plurality of pixels to decrease the time required to decompress the entire Y pixel array in a DPCM System.

The invention can be implemented by a computer properly programmed to perform the functions of the compressor or decompressor or by a hardware compressor and/or hardware decompressor.

Briefly, a digital image differential pulse code modulation decompressor is provided for simultaneously generating, during a cycle of operation, a decompressed pixel value for a plurality of selected pixels in the array. The decompressor includes a storage for storing an encoded quantized error value for each selected pixel where the selected pixels are located on a diagonal in the array and a processing unit which simultaneously generates a decompressed value for each of the selected pixels. The decompressed value for a selected pixel is derived from the stored encoded quantized error value and the predicted value, generated by a prediction value generator in accordance with a predictor which is at least a 2nd-order, 2-D predictor for that selected pixel.

A digital image differential pulse code modulation compressor is provided for simultaneously compressing, during a single cycle of operation of the compressor, a plurality of selected pixels from the pixel array where the selected pixels are located on a diagonal of the pixel array. During a cycle of operation, the compressor generates a plurality of decompressed pixel values and a plurality of encoded quantized error values for the selected pixels. A storage stores a pixel value for each selected pixel of a plurality of pixels located on a diagonal of the array to be processed during a cycle of operation. A processing unit simultaneously generates a decompressed value for each selected pixel as a function of the pixel value stored in the storage for the selected pixel and a predicted value generated by a prediction value generator where the predictor used by the prediction value generator is at least a second order, two dimensional predictor.

BRIEF DESCRIPTION OF THE DRAWINGS

The invention will be described with respect to particular embodiments thereof and reference will be made to the drawings, in which.

DESCRIPTION OF THE INVENTION

The invention will be described in a DPCM system using the 3rd-order, 2-D predictor of $X=0.75(A+C)-0.5B+E$ for processing four pixels at a time. A cycle of operations is defined as the steps necessary to perform all of the functions necessary to simultaneously generate the decompressed values for four pixels.

Figure 6:
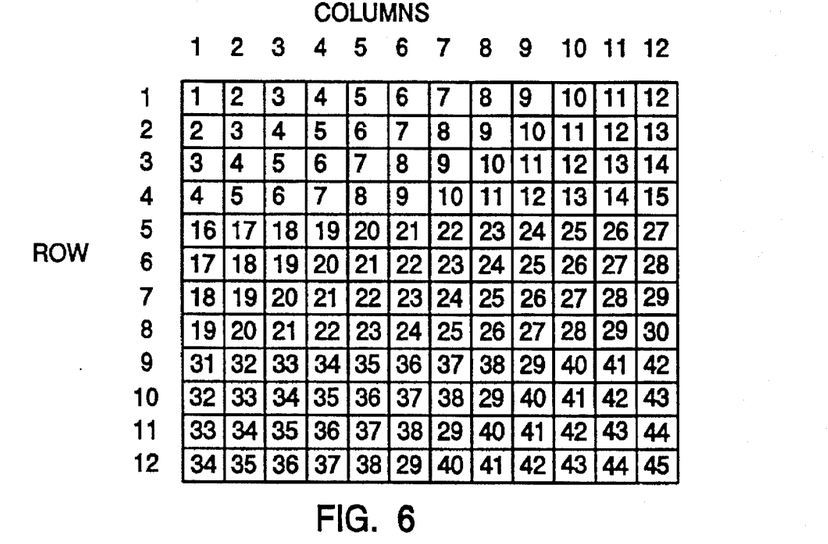
FIG. 6 is a drawing illustrating a 12 by 12 pixel array and the order in which the predicted value for each of the pixels is generated.

FIG. 6 illustrates an array of Y pixels where the array has the dimensions of 12 rows by 12 columns, thereby containing 144 pixels. The location of a pixel in the array is designated as P(x,y) where x is the column number and y is the row number. The number in each location designates the cycle of operation during which the decompressed value for that location will be processed. For example, during cycle 3 pixels P(3,1), P(2,2) and P(1,3) will be processed, during cycle 22 pixels P(7,5), P(6,6), P(5,7) and P(4,8) will be processed and during cycle 44 pixels P(12,11) and P(11,12) will be processed.

As can be seen from FIG. 6 during the first pass across the array, the predicted values for the first four rows will be calculated in 15 cycles of operation. During the second pass across the array the predicted values for rows 5, 6, 7 and 8 will be calculated in 15 cycles of operation and the predicted values of row 4 will be available for the prediction of values in row 5. Finally, during the third pass across the array the predicted values for rows 9, 10, 11 and 12 will be calculated in 15 cycles of operation and the predicted values of row 8 will be available for the prediction of values in row 9. Once again, where any value is not available for making a calculation a phantom value of a mid grey scale constant will be used. By following this procedure 144 pixels are processed in 45 cycles of operation, or approximately three times faster than the prior art. In the commonly used pixel array of 320 by 240 pixels, the 76,800 pixels in the array will be processed in 19,380 cycles, or approximately four times faster than the prior art. Also it should be noted that by using the diagonal, all of the prior decompressed pixel values needed for the calculation of the predicted value of a pixel on the diagonal have already been calculated and are available for use. The length of the diagonal that is used is a function of the processing power of the processing unit calculating the decompressed values for the pixels.

The number of cycles needed to process an entire array of x columns and y rows is equal to (x+n−1) multiplied by (y/n) where n is the selected number of pixels on the diagonal of said array to be processed during each cycle of operation of said decompressor.

Figure 8:
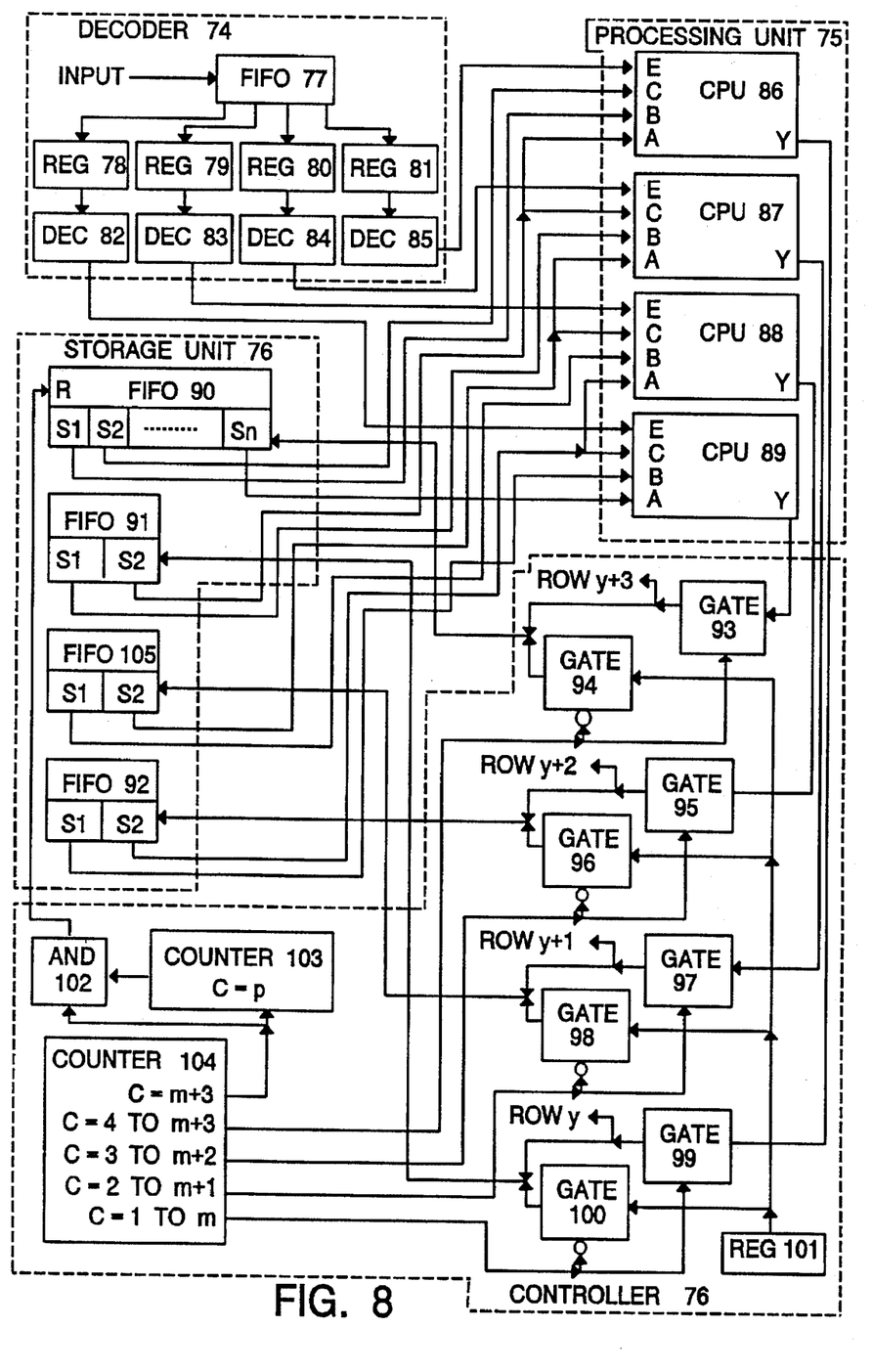
FIG. 8 is a block diagram of the Y data decompressor of the invention.

Referring to FIG. 8, the Y data decompressor of the invention is shown for processing four pixels simultaneously. A decoder 74 receives the encoded quantized error value for each pixel in the order that the pixels are to be processed during cycles of operation of the decompressor. The pixels are ordered from the top to bottom row on the diagonal of each cycle of operation, as illustrated in FIG. 6, where each location is numbered to indicate the cycle of operation that the pixel location will be processed. The encoded quantized error values are stored in FIFO 77. In the first pass across the array of FIG. 6, rows 1, 2, 3 and 4 will be processed during cycles of operation 1 through 15 where the pixels for each cycle of operation are shown enclosed by {}. Thus, in this first pass the pixels, including phantom pixels F, will be provided in the order of {P(1,1), F(-1,-2), F(-2,-3), F(-3,-4)}, {P(2,1), P(1,2), F(-1,-3), F(-2,-4)}, {P(3,1), P(2,2), P(1,3), F(-1,-4) }, {P(4,1), P(3,2), P(2,3), P(1,4)}, {5}, {6}, {7}, {8}, {9}, {10}, {11}, {P(12,1), P(11,2), P(10,3), P(9,4) }, {F(13,1), P(12,2), P(11,3), P(10,4)}, {F(14,1), F(13,2), P(12,3), P(11,4)}, {F(15,1), F(14,2), F(15,3), P(12,4)}. Cycles 1, 2, 3, 13, 14 and 15 have less than four pixels existing in the array and, therefore, phantom values F are inserted into the sequence such that four pixels (comprised of actual or phantom pixels) will be processed during each cycle of operation.

The four two bit encoded quantized error values for a given cycle of operation are buffered in registers 78, 79, 80 and 81. Register 81 stores the first encoded quantized error value for each cycle of operation, for example in cycle {4}register 81 stores the encoded quantized error value for location P(4,1). Decoder 85 decodes the two bit encoded quantized error value in register 81 into one of four selected error values, for example, to either −12, −3, 3 or 12. Register 80 stores the second encoded quantized error value for each cycle of operation, for example register 81 in cycle {4} will store the encoded quantized error value for location P(3,2). Decoder 84 decodes the two bit encoded quantized error value in register 80 into one of four selected error values, for example to either −12, −3, 3 or 12. Register 79 stores the third encoded quantized error value for each cycle of operation, for example register 19 in cycle {4} will store the encoded quantized error value for location P(2,3). Decoder 83 decodes the two bit encoded quantized error value in register 79 into one of four selected error values, for example to either −12, −3, 3 or 12. Register 78 stores the fourth encoded quantized error value for each cycle of operation, for example register 78 in cycle {4} will store the encoded quantized error value for location P(1,4). Decoder 82 decodes the two bit encoded quantized error value in register 78 into one of four selected error values, for example to either −12, −3, 3 or 12.

The processing unit 75 receives the four selected error values from decoders 85, 84, 83 and 82. Processing unit 75 is shown to have four separate central processing units CPUs 86, 87, 88 and 89. It should be realized that the four separate processing units can be replaced by any processing unit capable of processing simultaneously data to form the decompressed value for each of the four pixels being processed. Such a processing unit could be a computer system capable of processing multi-tasks at the same time where each task is the computation of the decompressed value for a given pixel. Another processing unit could be a single microprocessor that has sufficient word length that allows the formatting and processing of words where each word contains the data for the plurality of pixels being processed.

In CPU 86, input E is connected to the output of decoder 85 to receive the selected error value generated by decoder 85, input C is connected to stage S2 of FIFO 90 to receive the decompressed value of the pixel C as shown in FIG. 5, input B is connected to stage S1 of FIFO 90 to receive the decompressed value of pixel B as shown in FIG. 5, and input A is connected to stage S2 of FIFO 91 to receive the decompressed value of pixel A as shown in FIG. 5. CPU 86 performs the computation 0.75(A+C)−0.5B+E to generate the decompressed value Y at output Y for pixel X.

In CPU 87, input E is connected to the output of decoder 84 to receive the selected error value generated by decoder 84, input C is connected to stage S2 of FIFO 91 to receive the decompressed value of pixel C as shown in FIG. 5, input B is connected to stage S1 of FIFO 91 to receive the decompressed value of pixel B as shown in FIG. 5 and input A is connected to stage S2 of FIFO 105 to receive the decompressed value of pixel A as shown in FIG. 5. CPU 87 performs the computation 0.75(A+C)−0.5B+E to generate the decompressed value Y at output Y for pixel X.

In CPU 88, input E is connected to the output of decoder 83 to receive the selected error value generated by decoder 83, input C is connected to stage S2 of FIFO 105 to receive the decompressed value of pixel C as shown in FIG. 5, input B is connected to stage S1 of FIFO 105 to receive the decompressed value of pixel B as shown in FIG. 5 and input A is connected to stage S2 of FIFO 92 to receive the decompressed value of pixel A as shown in FIG. 5. CPU 88 performs the computation 0.95(A+C)−0.5B+E to generate the decompressed value Y at output Y for pixel X.

In CPU 89, input E is connected to the output of decoder 82 to receive the selected error value generated by decoder 82, input C is connected to stage S2 of FIFO 92 to receive the decompressed value of pixel C as shown in FIG. 5, input B is connected to stage S1 of FIFO 92 to receive the decompressed value of pixel B as shown in FIG. 5 and input A is connected to stage Sn of FIFO 90 to receive the decompressed value of pixel A as shown in FIG. 5. CPU 85 performs the computation 0.75(A+C)−0.5B+E to generate the decompressed value Y at output Y for pixel X.

Storage unit 76 is comprised of four FIFOs, 90, 91, 105 and 92, and are used to temporarily store the previous decompressed values needed by the processing unit 75 to compute four new decompressed values. FIFO 90 has n stages where n is one higher then the number of locations in a row of an array of pixels, for example for the array shown in FIG. 6 n would equal 13. FIFO 90 initially stores a constant in each stage to provide the B and C phantom decompressed values during the computation of decompressed values for the pixels in row 1 of the array. During each cycle of operation either the decompressed value generated by CPU 89 or a constant stored in register 101 of controller 76 will be stored in stage Sn of FIFO 90. Controller 76 will cause the constant stored in register 101 to pass through transmission gate 94 and to be stored in stage Sn of FIFO 90 during the first three cycles of operation for each pass across the array, that is when counter 104 has the count of 1, 2 and 3. Thereafter controller 76 will cause the decompressed value generated by CPU 89 to pass through transmission gate 93 and to be stored in stage Sn of FIFO 90 during each of the remaining cycles of operation for each pass across the array. Counter 104 is a cyclic counter, counting from 1 to (m+3), where m is equal to the number of pixels in a row of the array. At the end of each pass across the array, FIFO 90 will have a constant stored in stage S1 and will have all of the decompressed values for the pixels in the last row of the previous pass across the array stored in stages S2 through Sn. For the array shown in FIG. 6, after the first pass across the array, FIFO 90 would have stored in stages S2 through Sn the decompressed values for the pixels in the fourth row, that is decompressed values Y(1,4) * * Y(12,4) respectively. After the second pass across the array, FIFO 90 would have stored in stages S2 through Sn the decompressed values for the pixels in the eighth row, that is decompressed values Y(1,8) * * Y(12,8) respectively. After the third pass across the array, FIFO 90 would have stored in stages S2 through Sn the decompressed values for the pixels in the twelfth row, that is decompressed values Y(1,12) * * Y(12,12), respectively. After completion of the last cycle of the pass for the array, FIFO 90 is reset such that all the stages will contain the constant K in preparation for the next array of pixels to be processed. Counter 104 provides a raised signal when C=m+3 which indicates the completion of the last cycle of operation for a pass across the array. Counter 103 counts the number of passes and will generate a raised signal when C=p which indicates the completion of a cycle of operation. AND 102 provides a raised output when both the outputs of counters 103 and 104 are raised. FIFO 90 will be reset in response to the raised output from AND 102.

FIFO 91 has stages S1 and S2 which initially store a constant. During each cycle of operation either the decompressed value Y generated by CPU 86 or a constant stored in register 101 of controller 76 will be stored in stage S2 of FIFO 91. Controller 76 will cause the constant stored in register 101 to pass through transmission gate 100 and to be stored in stage S2 of FIFO 91 during the last three cycles of operation for each pass across the array, that is when counter 104 has the count of (m+1), (m+2) and (m+3). Controller 76 will cause the decompressed value Y generated by CPU 86 to pass through transmission gate 99 and to be stored in stage S2 of FIFO 91 during the cycles of operation from 1 to m. During each cycle of operation, Stage S2 provides decompressed value A to CPU 86 and decompressed C value to CPU 87 and stage S1 provides decompressed value B to CPU 87. FIFO 91 will have a constant stored in stages S1 and S2 upon the completion of each pass across the array.

FIFO 105 has stages S1 and S2 which initially store a constant. During each cycle of operation either the decompressed value Y generated by CPU 87 or a constant stored in register 101 of controller 76 will be stored in stage S2 of FIFO 105. Controller 76 will cause the constant stored in register 101 to pass through transmission gate 98 and to be stored in stage S2 of FIFO 105 during cycles of operation 1, (m+2) and (m+3) for each pass across the array. Controller 76 will cause the decompressed value Y generated by CPU 87 to pass through transmission gate 97 and to be stored in stage S2 of FIFO 105 during the cycles of operation from 2 to (m+1). During each cycle of operation, Stage S2 provides decompressed value A to CPU 87 and decompressed value C to CPU 88 and stage S1 provides decompressed value B to CPU 88. FIFO 105 will have a constant stored in stages S1 and S2 upon the completion of each pass across the array.

FIFO 92 has stages S1 and S2 which are initially store a constant. During each cycle of operation either the decompressed value Y generated by CPU 89 or a constant stored in register 101 of controller 76 will be stored in stage S2 of FIFO 92. Controller 76 will cause the constant stored in register 101 to pass through transmission gate 96 and to be stored in stage S2 of FIFO 92 during cycles of operation 1, 2 and (m+3) for each pass across the array. Controller 76 will cause the decompressed value Y generated by CPU 89 to pass through transmission gate 95 and to be stored in stage S2 of FIFO 92 during the cycles of operation from 3 to (m+2). During each cycle of operation, Stage S2 provides decompressed value A to CPU 88 and decompressed value C to CPU 89 and stage S1 provides decompressed value B to CPU 89. FIFO 92 will have the decompressed value Y(12,3) stored in stage S1 and the constant stored in stages S2 upon the completion of each pass across the array. This however does not present a problem since the decompressed value Y generated by CPU 89 is discarded.

The decompressor of FIG. 8 provides for storage in the Y decompressed data storage of the prior art the decompressed values for the pixels in the first row at the output of gate 99, the decompressed values for the pixel in the second row at the output of gate 97, the decompressed values for the pixels in the third row being at the output of gate 96 and the decompressed values for the pixels in the fourth row at the output of gate 93. The logic associated with the Y decompressed data storage realign the received decompressed values for the four rows so as to place each decompressed value in the decompressed values proper location in the array of decompressed values stored in the storage.

A programmed processor in conjunction with a memory unit can perform the functions of decoder 74, controller 76 and processing unit 75.

Figure 9:
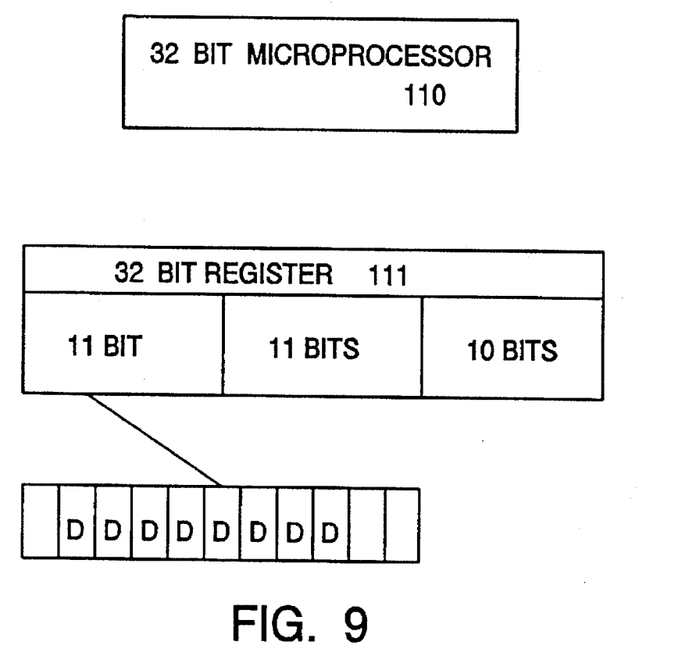
FIG. 9 is a diagram illustrating how a 32 bit register in a single microprocessor may be used to simultaneously process three pixels on a diagonal in the array.

The processing unit 75 may be a single programmed microprocessor of the type disclosed in the heretofore cross referenced patent applications. FIG. 9 illustrates one such 32 bit microprocessor 110 having a 32 bit register 111. If the decompressed value for a pixel is to be expressed as an eight bit value, then three pixels can be processed by the 32 bit microprocessor 110 without incurring any computation error. The 32 bit word is divided into three segments where each segment includes the data for one of the three pixels and a guard space such that the results of any computation in any segment does not introduce an error into the results of any computation performed in any other segment. The 32 bit word would include three values of A, B, C or E for the three pixels being processed and would have the format of:

00DDDDDDDD0 00DDDDDDDD0 00DDDDDDD

The decompressed value Y=0.75(A+C)−0.5B+E may be calculated for three pixels in the following fashion:

1) Perform the function A+C with the results G appearing in the 32 bit register as:

0GGGGGGGGG0 0GGGGGGGGG0 0GGGGGGGGG.

Note the results could have a nine bit value.

2) perform the function 2*G, 2(A+C), by shifting the contains of the 32 bit register 111 one bit to the left with the results H appearing in the 32 bit register as:

HHHHHHHHHH00 HHHHHHHHHH00 HHHHHHHHH0.

Note the results could have a ten bit value.

3) perform the function G+2*G, 3(A+C) with the results I appearing in the 32 bit register 111 as:

IIIIIIII0 IIIIIIII0 IIIIIIII.

Note that the results could have a ten bit value.

4) perform the function I/2, 1.5(A+C), by shifting the contains of the 32 bit register 111 one bit to the left with the results J appearing in the 32 bit shift register 111 as:

0JJJJJJJJJ 0JJJJJJJJJ 0JJJJJJJJ.

Note that results now have nine integer bit and one fraction bit and the last group lost the fraction bit in this operation.

5) perform the function of J–B, 1.5(A+C)–B with the results appearing in the 32 bit shift register 111 as:

0KKKKKKKKKK 0KKKKKKKKKK 0KKKKKKKKK.

Note that in performing this computation the constant 00000000001 00000000001 0000000000 must be added to the results of the subtraction to obtain a correct value for the first and second groups of bits.

6) perform the function K/2, 0.75(A+C)–0.5b, by shifting the contains of the 32 bit register 111 one bit to the right with the results L appearing in the 32 bit shift register 111 as:

00LLLLLLLLL L'0LLLLLLLLL L'0LLLLLLLL.

Note that the results will have eight integer bits and two fraction bits with the low order fraction bit L' for two groups now residing as the high order bit in the neighboring group and low order fractional bit L' for the last group has been discarded.

7) perform the function L+E, 0.75(A+C)–0.5B+E, with the results Y appearing in the 32 bit register 111 as:

0YYYYYYYYYY Y'YYYYYYYYYY Y''YYYYYYYY.

Note that could result in nine integer bits and two fractional bits however the practical limitation is that the results will be no larger than eight integer bits and the fractional bits will be discarded.

8) mask off the unused bits to provide three decompressed pixel values in the resulting word represented as:

00YYYYYYYY0 00YYYYYYYY0 00YYYYYYYY.

Therefore, a single 32 bit microprocessor is capable of simultaneously computing three decompressed pixel values.

Figure 10:
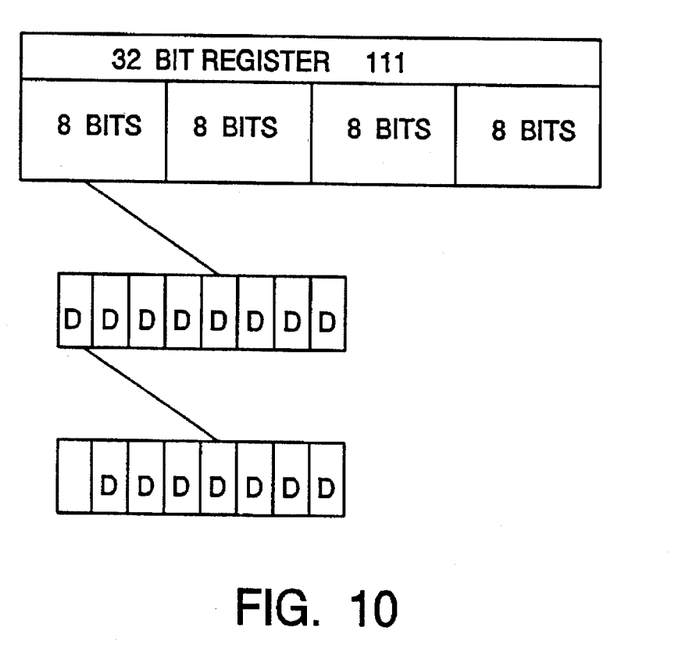
FIG. 10 is a diagram illustrating how a 32 bit register in a single microprocessor may be used to simultaneously process four pixels on a diagonal in the array.

FIG. 10 illustrates the 32 bit register 111 divided in to four eight bit segments. If an eight bit value is used to express a pixel then there is no room for a guard band between the pixel value and erroneous results would occur if the same computation, as described above for three pixels, is attempted.

If the pixels were expressed as a seven bit value in the entire system then a one bit guard band is available and the data word would have the format of:

0DDDDDDD 0DDDDDDD 0DDDDDDD 0DDDDDDD

The decompressed value Y=0.75(A+C)–0.5B+E may be calculated for four pixels in the following fashion:

1) Perform the function 2*A with the results G appearing in the 32 bit register as:

GGGGGGG0 GGGGGGG0 GGGGGGG0 GGGGGGG0.

Note the results could have an eight bit value with the low order bit in each group having a value of 0.

2) perform the function G+A, 3A, with the results H appearing in the 32 bit register 111 as:

HHHHHHHH HHHHHHHH HHHHHHHH HHHHHHHH.

Note that the results has a maximum value of an eight bit value.

3) perform the function H/2, 1.5A, with the results I appearing in the 32 bit register 111 as:

0IIIIIII I'IIIIIII I'IIIIIII I'IIIIIII

Note that the results will have seven integer bits and one fractional bit I' where the fractional bit I' for three groups reside as the high order bit in a neighboring group and the last group has discarded the fractional bit I'.

4) Mask off the fractional bits and store results I as:

0IIIIIII 0IIIIIII 0IIIIIII 0IIIIIII

5) Perform the function 2*B with the results J appearing in the 32 bit register as:

JJJJJJJ JJJJJJJ JJJJJJJ JJJJJJJ.

Note the results could have an eight bit value.

6) Perform the function J+B, 3B, with the results appearing in the 32 bit register 111 as:

KKKKKKKK KKKKKKKK KKKKKKKK KKKKKKKK.

Note that the results can have a maximum value of an eight bit value.

7) Perform the function K/2, 1.5B, with the results L appearing in the 32 bit register 111 as:

0LLLLLLL L' LLLLLLL L' LLLLLLL L' LLLLLLL

Note that the results will have seven integer bits and one fractional bit L' where the fractional bit L' for three groups reside as the high order bit in a neighboring group and the last group has discarded the fractional bit L'.

8) Mask off the fractional bits L' and store results L as:

0LLLLLLL 0LLLLLLL 0LLLLLLL 0LLLLLLL

9) Perform the function I+L, 1.5(A+C) with the result M appearing in the 32 bit register 111 as:

MMMMMMMM MMMMMMMM MMMMMMMM MMMMMMMM

Note that the results could have an eight bit value.

10) Perform the function M–B, 1.5(A+C)–B, with the results N appearing in the 32 bit register 111 as:

NNNNNNNN NNNNNNNN NNNNNNNN NNNNNNNN

11) Perform the function N/2, 0.75(A+C)–0.5B, with the results P appearing in the 32 bit register 111 as:

0PPPPPPP P'PPPPPPP P'PPPPPPP P'PPPPPPP.

Note that the results will have seven integer bits and one fractional bit P' where the fractional bit P' for three groups reside as the high order bit in a neighboring group and the last group has discarded the fractional bit P'.

12) Mask off the fractional bits P' and store results P as:

0PPPPPPP 0PPPPPPP 0PPPPPPP 0PPPPPPP.

13) Perform the function P+E, 0.75(A+C)–0.5B+E, with the results Y appearing in the 32 bit register 111 as:

YYYYYYYY YYYYYYYY YYYYYYYY YYYYYYYY

Note that the results could be an eight integer bits however the practical limitation is that the results will be no larger than seven integer bits.

14) Mask off the unused bits to provide four pixel predication value in the resulting word represented as:

0YYYYYYY 0YYYYYYY 0YYYYYYY 0YYYYYYY.

Therefore, a single 32 bit microprocessor is capable of simultaneously computing four decompressed pixel values where the input data was limited to seven bits.

The sequence of steps shown for calculating the three and four decompressed values are not the only sequence of steps that would perform the desired computation and are used herein to exemplify the ability of employing a 32 bit microprocessor for performing the multiple computations of the decompressor of FIG. 8. Further, it can now be appreciated that a 32 bit microprocessor in conjunction with a storage unit can be programmed to be the multi pixel decompressor of the invention. In the four pixel discussion, some of the masking steps and the use of the constant in the subtraction step maybe omitted but in doing so errors will be introduced into the computations. The magnitude of the introduced errors could be small and the ultimate effect of the error on the reconstructed image may still provide an acceptable image to the user.

Figure 7:
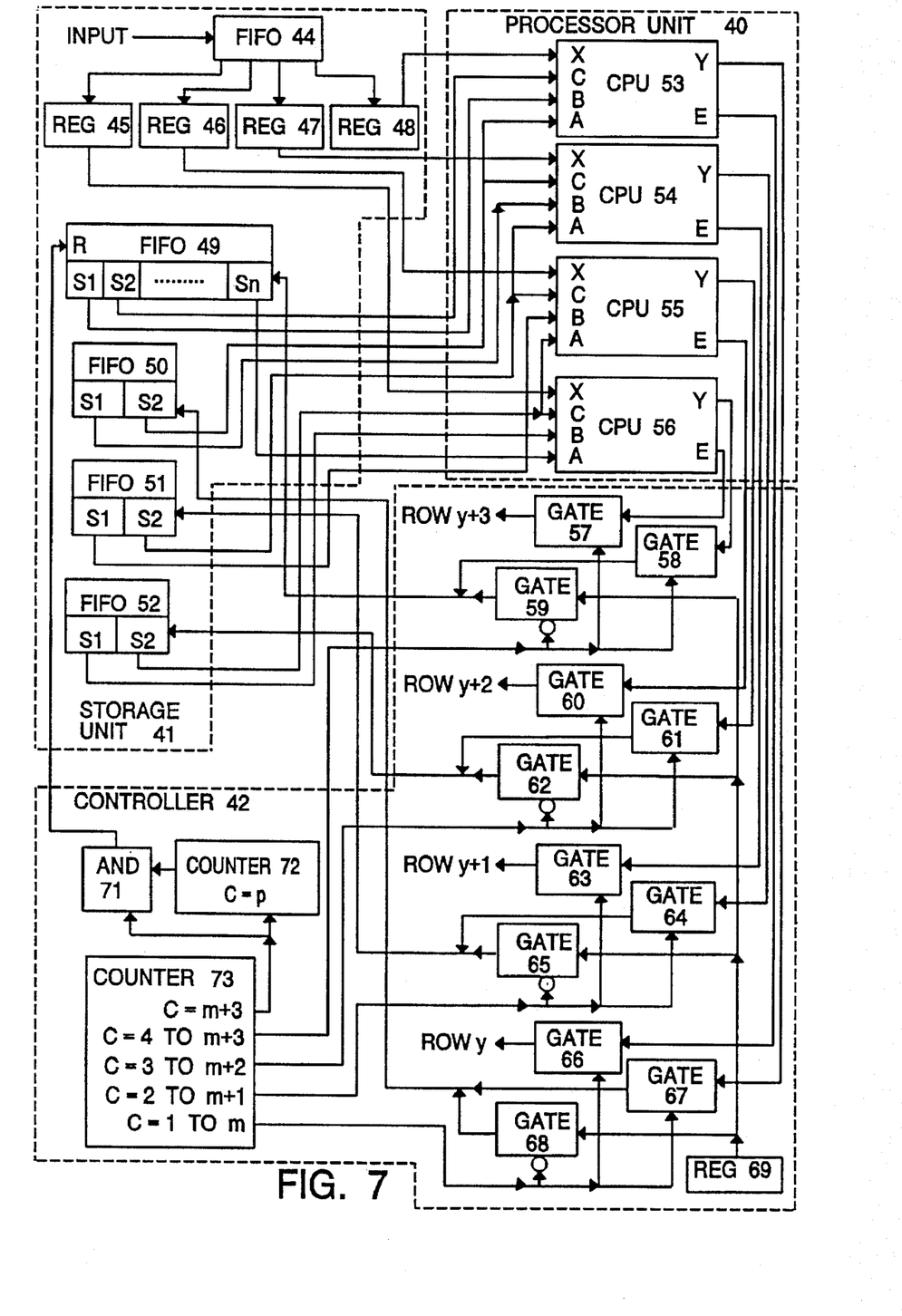
FIG. 7 is a block diagram of the Y data compressor of the invention.

The prior art compressors may be used to generate the two bit encoded quantized error value as long as the predicted value generator provides the same predicted value for each pixel as does the predicted value generator of the decompressor. Since the time needed to compress the data is not usually critical, the processing of one pixel at a time is an acceptable procedure.

Where there is a need for processing multiple pixels at the same time in the compressor, then the method and apparatus of the invention for the decompressor may be incorporated into the compressor. FIG. 7 is a block diagram of the part of the compressor that would include the apparatus for processing four pixels on the diagonal of an array at the same time.

Storage unit 41 has FIFO 44 which receives four pixel values X on the diagonal that are to be processed during the next cycle of operation. The logic within the Y data storage of FIG. 3 has the responsibility of providing the data in the proper sequence to FIFO 44. Again, if any of the pixels on the diagonal is a phantom pixel, that is not within the array, a constant value is provided for that phantom pixel to FIFO 44. At the beginning of a cycle of operation the four pixel values are transferred into registers 45, 46, 47, and 48. For each cycle of operation, register 48 stores the first pixel value located at P(x,y), register 47 stores the second pixel value located at P(x−1,y+1), register 46 stores the third pixel value located at P(x−2,y+2) and register 45 stores the fourth pixel value located at P(x−3,y+3) where the location of the pixels with respect to each other is shown in FIG. 6.

The processing unit 40 receives the four pixel values from registers 45, 46, 49 and 48. Processing unit 40 is shown to have four separate central processing units CPUs 53, 54, 55 and 56.

In CPU 53, the input X is connected to the output of register 48 to receive the first pixel value stored in register 48, input C is connected to stage S2 of FIFO 49 to receive the decompressed value C of pixel C as shown in FIG. 5, input B is connected to stage S1 of FIFO 49 to receive the decompressed value B of pixel B as shown in FIG. 5 and input A is connected to stage S2 of FIFO 50 to receive the decompressed value A of pixel A as shown in FIG. 5. CPU 53 performs the computation of 0.75(A+C)−0.5B to generate a predicted value W for the pixel being processed, performs the computation X-W to calculate the error V between the pixel value X and the predicted value W, quantizes the error value V to a quantized value U, performs the computation of adding the predicted value W and the quantized value U to generate the decompressed value Y at output Y, which will be the same as the decompressed value Y generated by the decompressor, and finally will encode the quantized value U into a two bit encoded quantized error value E at output E.

In CPU 54, the input X is connected to the output of register 47 to receive the second pixel value stored in register 47, input C is connected to stage S2 of FIFO 50 to receive the decompressed value C of pixel C as shown in FIG. 5, input B is connected to stage S1 of FIFO 50 to receive the decompressed value B of pixel B as shown in FIG. 5 and input A is connected to stage S2 of FIFO 51 to receive the decompressed value A of pixel A as shown in FIG. 5. CPU 54 performs the same computation as CPU 53.

In CPU 55, the input X is connected to the output of register 46 to receive the third pixel value stored in register 46, the input C is connected to stage S2 of FIFO 51 to receive the decompressed value C of pixel C as shown in FIG. 5, input B is connected to stage S1 of FIFO 51 to receive the decompressed value B of pixel B as shown in FIG. 5 and input A is connected to stage S2 of FIFO 52 to receive the decompressed value A of pixel A as shown in FIG. 5. CPU 55 performs the same computations as CPU 53.

In CPU 56, the input P is connected to the output of register 45 to receive the fourth pixel value stored in register 45, input C is connected to stage S2 of FIFO 52 to receive the decompressed value C of pixel C as shown in FIG. 5, input B is connected to stage S1 of FIFO 52 to receive the decompressed value B of pixel B as shown in FIG. 5 and input A is connected to stage Sn of FIFO 49 to receive the decompressed value A of pixel A as shown in FIG. 5. CPU 56 performs the same computations as CPU 53.

Storage unit 41 is comprised of four FIFOs 49, 50, 51 and 52 and is used to temporarily store the previous decompressed values needed by the processing unit 40. FIFO 49 has n stages where n is one higher then the number of locations in a row of an array of pixels, for example for the array shown in FIG. 6 n would equal 13. FIFO 49 initially stores a constant in each stage to provide the B and C phantom decompressed values during the computation of decompressed values for the pixels in row 1 of the array. During each cycle of operation either the decompressed value Y generated by CPU 56 or a constant stored in register 69 of controller 42 will be stored in stage Sn of FIFO 49. Controller 42 will cause the constant stored in register 69 to pass through transmission gate 59 and to be stored in stage Sn of FIFO 49 during the first three cycles of operation for each pass across the array, that is when counter 73 has the count of 1, 2 and 3. Thereafter controller 42 will cause the decompressed value Y generated by CPU 56 to pass through transmission gate 58 and to be stored in stage Sn of FIFO 49 and the encoded quantized error value E to pass through transmission gate 57 for storage in quantized error data storage of the compressor during each of the remaining cycles of operation for each pass across the array. Counter 73 is a cyclic counter, counting from 1 to (m+3), where m is equal to the number of pixels in a row of the array. At the end of each pass across the array, FIFO 49 will have a constant store in stage S1 and will have all the decompressed values for the pixels in the last row of the previous pass across the array stored in stages S2 through Sn. For the array shown in FIG. 6, after the first pass across the array, FIFO 49 would have stored in stages S2 through Sn the decompressed values for the pixels in the fourth row, that is decompressed values Y(1,4) * * Y(12,4), respectively. After the second pass across the array, FIFO 49 would have stored in stages S2 through Sn the decompressed values for the pixels in the eighth row, that is decompressed values Y(1,8) * * Y(12,8) respectively. After the third pass across the array, FIFO 49 would have stored in stages S2 through Sn the decompressed values for the pixels in the twelfth row, that is decompressed values Y(1,12) * * Y(12,12), respectively. After completion of the last cycle of the pass for the array, FIFO 49 is reset such that all the stages will contain the constant in preparation for the next array of pixels to be processed. Counter 73 provides a raised signal indicative of the completion of the last cycle of operation for a pass across the array. Counter 72 will generate a raised signal when the count in the counter 72 is equal to the number of the last pass across the array. And 71 provides a raised output when both the outputs of counters 71 and 73 are raised. FIFO 49 will be reset in response to the raised output from AND 71.

FIFO 50 has stages S1 and S2 which initially store a constant. During each cycle of operation either the decompressed value Y generated by CPU 53 or a constant stored in register 69 of controller 42 will be stored in stage S2 of FIFO 50. Controller 42 will cause the constant stored in register 69 to pass through transmission gate 68 and to be stored in stage S2 of FIFO 50 during the last three cycles of operation for each pass across the array, that is when counter 73 has the count of (m+1), (m+2) and (m+3). Controller 42 will cause the decompressed value Y generated by CPU 53 to pass through transmission gate 67 and then stored in stage S2 of FIFO 50 and the encoded quantized error value E to pass through transmission gate 66 for storage in quantized error data storage of the compressor during the cycles of operation from 1 to m. During each cycle of operation, Stage S2 provides decompressed value A to CPU 53 and decompressed value C to CPU 54 and stage S1 provides decompressed value B to CPU 54. FIFO 50 will have a constant store in stages S1 and S2 upon the completion of each pass across the array.

FIFO 51 has stages S1 and S2 which initially store a constant. During each cycle of operation either the decompressed value Y generated by CPU 54 or a constant stored in register 69 of controller 42 will be stored in stage S2 of FIFO 51. Controller 42 will cause the constant stored in register 69 to pass through transmission gate 65 and then stored in stage S2 of FIFO 51 during cycles of operation 1, (m+2) and (m+3) for each pass across the array. Controller 42 will cause the decompressed value Y generated by CPU 54 to pass through transmission gate 64 and then stored in stage S2 of FIFO 51 and the encoded quantized error value E to pass through transmission gate 63 for storage in quantized error data storage of the compressor during the cycles of operation from 2 to (m+1). During each cycle of operation, Stage S2 provides decompressed value A to CPU 54 and decompressed value C to CPU 55 and stage S1 provides decompressed value B to CPU 55. FIFO 51 will have a constant store in stages S1 and S2 upon the completion of each pass across the array.

FIFO 52 has stages S1 and S2 which initially store a constant. During each cycle of operation either the decompressed value Y generated by CPU 55 or a constant stored in register 69 of controller 42 will be stored in stage S2 of FIFO 52. Controller 42 will cause the constant stored in register 69 to pass through transmission gate 62 and then stored in stage S2 of FIFO 52 during cycles of operation 1, 2 and (m+3) for each pass across the array. Controller 42 will cause the decompressed value generated by CPU 55 to pass through transmission gate 61 and then stored in stage S2 of FIFO 52 and the encoded quantized error value E to pass through transmission gate 60 for storage in quantized error data storage of the compressor during the cycles of operation from 3 to (m+2). During each cycle of operation, Stage S2 provides decompressed value A to CPU 55 and decompressed value C to CPU 56 and stage S1 provides decompressed value B to CPU 56. FIFO 52 will have the decompressed value Y(12,3) stored in stage S1 and the constant stored in stages S2 upon the completion of each pass across the array. This however does not present a problem since the decompressed value generated by CPU 56 is discarded.

A programmed processor in conjunction with a memory unit can perform the functions of controller 42 and processing unit 40. The actual processors that were discussed with regards to the decompressor are also equally applicable for use in the compressor.

It should be understood that implementation of the other variations and modifications of the invention in its various aspects will be apparent to those skilled in the art and that the invention is not limited thereto by the specific embodiment described. The present invention is therefore contemplated to cover any and all modifications, variations and equivalents that fall within the true spirit and scope of the underlying principles disclosed and claimed herein.

What is claimed is:

1. A digital image differential pulse code modulation decompressor for simultaneously generating, during a cycle of operation of said decompressor, a decompressed pixel value for a plurality of selected pixels located on a diagonal of an array of pixels where said array has x columns and y rows and where said decompressed pixel values are used in generating an image, said decompressor comprising:

a storage means for storing an error value for each selected pixel to be processed during a cycle of operation of said decompressor;

a processing means for simultaneously generating, during said cycle of operation of said decompressor, a decompressed value for each said selected pixel where said decompressed value for a selected pixel is derived from said error value stored in said storage means for said selected pixel and a predicted value generated by said processing means for each selected pixel where said predicted value is derived from a predictor, said predictor being at least a second order, two dimensional predictor.

2. A digital image differential pulse code modulation decompressor for simultaneously generating, during a cycle of operation of said decompressor, a decompressed pixel value for a plurality of selected pixels located on a diagonal of an array of pixels where said array has x columns and y rows and where said decompressed pixel values are used in generating an image, said decompressor comprising:

a storage means for storing an error value for each selected pixel to be processed during a cycle of operation of said decompressor;

a processing means for simultaneously generating, during said cycle of operation of said decompressor, a decompressed value for each said selected pixel where said decompressed value for a selected pixel is derived from said error value stored in said storage means for said selected pixel and a predicted value generated by said processing means for each selected pixel where said predicted value is derived from a predictor, said predictor being at least a second order, two dimensional predictor; and wherein the number of cycles of operation needed to generate all predicted pixel values included in said array is equal to (x+n−1) multiplied by (y/n) where n is the selected number of pixels on the diagonal of said array to be processed during each cycle of operation of said decompressor.

3. The decompressor of claim 2 wherein said storage means comprises:

means for receiving and storing encoded quantized error values for said selected pixels;

means for decoding said encoded quantized error values into said error values for said selected pixels.

4. The decompressor of claim 2 wherein said processing means comprises:

first storage means for storing decompressed values of pixels which were generated during previous cycles of operations to a present cycle of operation of said decompressor;

prediction means for simultaneously generating said predicted pixel value for each said selected pixel where said predicted value is derived from decompressed values stored in said first storage in accordance with said selected predictor; and control means for transferring said decompressed values for said selected pixels generated during said present cycle of operation to said first storage means for use during a future cycle of operation of said decompressor.

5. The decompressor of claim 4 wherein said processing means further comprises:

adding means for simultaneously adding said predicted value for each of said selected pixels to said error value for each of said selected pixel to form said decompressed value for each said selected pixel during the said cycle of operation.

6. The decompressor of claim 4 wherein said processing means is a single 32 bit microprocessor.

7. The decompressor of claim 6 wherein:

said number n of said selected pixels on the diagonal to be processed during each cycle of operation is four; and said 32 bit processor simultaneously generates a seven bit decompressed value for each of said four selected pixels.

8. The decompressor of claim 6 wherein said number n of said selected pixels on the diagonal to be processed during each cycle of operation is three; and said 32 bit processor simultaneously generates an eight bit decompressed value for each of said three selected pixels.

9. The decompressor of claim 4 wherein said predictor is a third order, two dimensional predictor.

10. A digital image differential pulse code modulation compressor for simultaneously generating, during a cycle of operation of said compressor, a decompressed value and an encoded quantized error value for each of a plurality of selected pixels located on a diagonal of an array of pixels where said encoded quantized error values will be used in generating an image represented by said array of pixels, said array having x columns and y rows, said compressor comprising:

a storage means for storing an array value for each selected pixel of said plurality of selected pixels to be processed during a cycle of operation of said compressor; and a processing means for concurrently processing, during said cycle of operation of said compressor, each said array value stored in said storage means to generate for each said selected pixel of said plurality of selected pixels:

a decompressed value derived from said array value and a predicted value generated by said processing means for said selected pixel where said predicted value is derived from a predictor, said predictor being at least a second order, two dimensional predictor; and an encoded quantized error value generated from the difference between said array value and said predicted value for said selected pixel.

11. A digital image differential pulse code modulation compressor for simultaneously generating, during a cycle of operation of said compressor, a decompressed value and an encoded quantized error value for each of a plurality of selected pixels located on a diagonal of an array of pixels where said encoded quantized error values will be used in generating an image represented by said array of pixels, said array having x columns and y rows, said compressor comprising:

a storage means for storing an array value for each selected pixel to be processed during a cycle of operation of said compressor; and a processing means for simultaneously generating, during said cycle of operation of said compressor, a decompressed value for each said selected pixel where said decompressed value for a selected pixel is derived from said array value stored in said storage means for said selected pixel and a predicted value generated by said processing means for each selected pixel where said predicted value is derived from a predictor, said predictor being at least a second order, two dimensional predictor;

an encoded quantized error value, for each said selected pixel, generated from the difference between said array value and said predicted value of each of said selected pixels;

first storage means for storing decompressed values for pixels which were generated during previous cycles of operations to a present cycle of operation of said decompressor;

prediction means for simultaneously generating said predicted pixel value for each said selected pixel where said predicted value is derived from decompressed values stored in said first storage means in accordance with said predictor; and control means for transferring said decompressed values for said selected pixels generated during said present cycle of operation to said first storage means for use during a future cycle of operation of said decompressor.

12. The compressor of claim 11 wherein said processing means further comprises:

subtracting means for simultaneously subtracting said predicted value for each of said selected pixels from said array value for each of said selected pixel to form an error value for each said selected pixels during the said cycle of operation;

quantizing means for simultaneously for converting said error value for each of said selected pixels into a selected error value for each of said selected pixels during said cycle of operation where the number of possible selected error values are less than the number of possible error values; and adding means for adding said selected error value for each said selected pixel to said prediction value for said selected pixel to form said decompressed value for each of said selected pixel.

13. The compressor of claim 12 wherein said processing means further comprises:

encoding means for simultaneously encoding said selected error value for each of said pixels into an encoded quantized error value for each of said selected pixels where the number of binary bits necessary to represent said encoded quantized error value is less than the number of binary bits necessary to represent said selected error value.

14. The compressor of claim 11 wherein said predictor is a third order, two dimensional predictor.

15. A digital image differential pulse code modulation decompression method for simultaneously generating, during a cycle of operation of said decompression method, a decompressed value for a plurality of selected pixels located on a diagonal of an array of pixels where said decompressed values for the pixels in said array are used in recreating a visual image, said method comprising the steps of:

storing an error value for each selected pixel to be processed during a cycle of operation;

simultaneously generating, during said cycle of operation, a predicted value for each selected pixel where said predicted value is derived from a predictor, said predictor being at least a second order, two dimensional predictor; and simultaneously generating, during said cycle of operation of said decompressor, a decompressed value for each said selected pixel where said decompressed value for a selected pixel is derived from said error value for said selected pixel and said predicted value for said selected pixel.

* * * * *